United States Patent Office.

ANSON C. McMAHAN, OF LINCOLN, ILLINOIS.

*Letters Patent No.* 94,428, *dated August* 31, 1869; *reissue No.* 3,737, *dated November* 16, 1869.

IMPROVEMENT IN COMPOUND FOR CURING CHOLERA IN HOGS AND CHICKENS.

The Schedule referred to in these Letters Patent and making part of the same.

*To all whom it may concern:*

Be it known taat I, ANSON C. McMAHAN, of Lincoln, in the county of Logan, and State of Illinois, have invented a new and valuable Improvement in the Cure of Cholera in Hogs and Chickens; and I do hereby declare that the following is a full, clear, and exact description of the same.

My invention relates to medical compounds intended for use in curing the disease called the cholera, in hogs and chickens; and It consists, mainly, in a novel compound and process for compounding assafœdita, sulphur, and black antimony.

My medicine is compounded as follows, namely:

I take one pound of assafœdita and place it in a kettle containing two gallons of rain-water. I then heat the water to 130° Fahrenheit, and until the assafœdita is dissolved. I next strain the solution through a fine sieve and let it stand. I then take one pound of sulphur and place it in two gallons of rain-water, in a suitable vessel, and heat them to 98° Fahrenheit, stirring and mixing them thoroughly while the heating-process is going on, and keep them at that temperature one hour. I then mix the two solutions together, making four gallons in all, less the necessary evaporation. I next put the liquid so formed in bottles, and set such bottles in a room of even temperature for three months, to allow fermentation to become complete. At the expiration of the above-named period, or at any time after fermentation has been completed, I add four drachms of black antimony to each quart of the solution.

I administer the above remedy to hogs in doses varying from half a gill to a gill, and repeat the doses each half hour until the animal is cured.

To administer my remedy to chickens, I sprinkle it over meal or dough.

What I claim as my invention, and desire to secure by Letters Patent, is—

The medical compound herein described, compounded in the proportions and in the manner substantially as specified.

In testimony that I claim the above, I have hereunto subscribed my name, in the presence of two witnesses.

ANSON C. McMAHAN.

Witnesses:
WM. G. STARKEY,
D. H. HARTS.